United States Patent
Wanakule et al.

(10) Patent No.: US 11,027,526 B2
(45) Date of Patent: Jun. 8, 2021

(54) REFLECTIVE GLAZING COMPRISING A THIN LAYER OF SILICON-RICH SILICON NITRIDE

(71) Applicant: SAINT-GOBAIN GLASS FRANCE, Courbevoie (FR)

(72) Inventors: Nisita Wanakule, Paris (FR); Rosiana Aguiar, Paris (FR); Estelle Martin, Saint-Denis (FR); Jean Carlos Lorenzzi, Paris (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 16/603,884

(22) PCT Filed: Apr. 12, 2018

(86) PCT No.: PCT/FR2018/050920
§ 371 (c)(1),
(2) Date: Oct. 9, 2019

(87) PCT Pub. No.: WO2018/189488
PCT Pub. Date: Oct. 18, 2018

(65) Prior Publication Data
US 2020/0115276 A1    Apr. 16, 2020

(30) Foreign Application Priority Data

Apr. 12, 2017 (FR) ...................................... 17 53197

(51) Int. Cl.
*B32B 17/10* (2006.01)
*C03C 17/22* (2006.01)
*C03C 17/34* (2006.01)

(52) U.S. Cl.
CPC ...... *B32B 17/10201* (2013.01); *C03C 17/225* (2013.01); *C03C 17/3435* (2013.01); *C03C 2217/281* (2013.01); *C03C 2218/155* (2013.01); *C03C 2218/156* (2013.01); *Y10T 428/2495* (2015.01)

(58) Field of Classification Search
CPC ...... B32B 17/00–1099; B32B 7/00–14; C03C 17/00–44; Y10T 428/00–8305; G02B 5/00–32; F24C 15/00–20
See application file for complete search history.

(56) References Cited

U.S. PATENT DOCUMENTS

| | | | |
|---|---|---|---|
| 5,897,372 A | 4/1999 | Howard | |
| 6,117,767 A | 9/2000 | Howard | |
| 6,749,941 B2 * | 6/2004 | Lingle | C03C 17/36 427/165 |
| 2003/0031879 A1 | 2/2003 | Neuman et al. | |
| 2003/0108779 A1 | 6/2003 | Neuman et al. | |
| 2004/0161616 A1 | 8/2004 | Neuman et al. | |
| 2004/0214013 A1 | 10/2004 | Stachowiak et al. | |
| 2005/0202254 A1 | 9/2005 | Nunez-Regueiro et al. | |
| 2005/0287309 A1 | 12/2005 | Veerasamy | |
| 2006/0292381 A1 | 12/2006 | Kriltz et al. | |
| 2007/0009746 A1 | 1/2007 | Corsner et al. | |
| 2007/0166553 A1 | 7/2007 | Nunez-Regueiro et al. | |
| 2007/0172647 A1 | 7/2007 | Kleideiter et al. | |
| 2009/0068447 A1 | 3/2009 | Blacker et al. | |
| 2009/0226714 A1 | 9/2009 | Veerasamy | |
| 2010/0255294 A1 * | 10/2010 | Yaoita | C03C 17/3435 428/336 |
| 2011/0117371 A1 | 5/2011 | Nunez-Regueiro et al. | |
| 2011/0262726 A1 | 10/2011 | Knoll et al. | |
| 2012/0141806 A1 | 6/2012 | Nunez-Regueiro et al. | |
| 2012/0177899 A1 | 7/2012 | Unquera et al. | |
| 2013/0108848 A1 | 5/2013 | Nunez-Regueiro et al. | |
| 2014/0071524 A1 | 3/2014 | Disteldorf et al. | |
| 2014/0098415 A1 | 4/2014 | Wuillaume et al. | |
| 2015/0132555 A1 | 5/2015 | Wuillaume et al. | |
| 2015/0140354 A1 | 5/2015 | Pallotta et al. | |
| 2015/0232377 A1 | 8/2015 | Knoll et al. | |
| 2016/0116651 A1 | 4/2016 | Disteldorf et al. | |
| 2016/0214887 A1 * | 7/2016 | Illy | C03C 17/2456 |
| 2016/0318795 A1 | 11/2016 | Knoll et al. | |
| 2016/0340235 A1 | 11/2016 | Wuillaume et al. | |
| 2017/0204001 A1 * | 7/2017 | Maillet | C03C 17/225 |
| 2017/0267580 A1 | 9/2017 | Lingle et al. | |
| 2017/0322355 A1 | 11/2017 | Disteldorf et al. | |
| 2018/0111873 A1 | 4/2018 | Pallotta et al. | |

FOREIGN PATENT DOCUMENTS

| | | | |
|---|---|---|---|
| EP | 1 238 950 A2 | 9/2002 | |
| EP | 2 226 305 A1 | 9/2010 | |
| WO | WO 02/090281 A2 | 11/2002 | |
| WO | WO 2005/097697 A1 | 10/2005 | |
| WO | WO 2009/032032 A1 | 3/2009 | |
| WO | WO 2011/062574 A1 | 5/2011 | |
| WO | WO-2015033067 A1 * | 3/2015 | ............... F23M 7/00 |
| WO | WO-2015145073 A1 * | 10/2015 | ........... C03C 17/245 |

OTHER PUBLICATIONS

Dobrowolski, J.A. (eds. Bass et al.). "Chapter 42: Optical Properties of Films and Coatings", Handbook of Optics, vol. I: Fundamentals, Techniques and Design, (1995); pp. 42.3-42.130.*
International Search Report dated Jul. 19, 2018 in PCT/FR2018/050920 filed on Apr. 12, 2018.

* cited by examiner

*Primary Examiner* — Phashant J Khatri
(74) *Attorney, Agent, or Firm* — Oblon, McClelland, Maier & Neustadt, L.L.P.

(57) ABSTRACT

A glass article includes at least one glass substrate on which a stack of layers is deposited. The stack includes at least one layer consisting of a layer of silicon nitride of formulation $SiN_x$, in which x is less than 1.25. The physical thickness of the $SiN_x$ layer is between 5 and 50 nm. The light reflection of the glass article, measured on the side of the substrate on which the stack is deposited, is greater than 20%.

20 Claims, No Drawings

REFLECTIVE GLAZING COMPRISING A THIN LAYER OF SILICON-RICH SILICON NITRIDE

The invention relates to the field of glass articles, in particular used as glazings, which can be used especially as door of an oven, comprising, at their surface, coatings which reflect solar radiation. Such a glass article can also be used in the field of glazings for buildings or for motor vehicles. The term glazing is understood to mean, within the meaning of the present invention, any glass product composed of one or more glass substrates, in particular single glazings, double glazings, triple glazings, laminated glazings, and the like.

Such reflective glazings are as a rule provided with a thin layer or with a stack of thin layers which act on the incident radiation essentially by reflection.

Currently, different types of coatings are known. These coatings are conventionally deposited by deposition techniques of the CVD type for the simplest. For example, the properties of reflection of a silicon oxycarbide layer deposited by the pyrolytic route at the surface of a glass substrate have been known for a long time. In addition, the very strong reflection in the visible region of such a layer makes it possible to confer, on the glazing, a mirror appearance, on the one hand, and a suitable color in transmission, giving the glazing, seen from the outside of the cavity (layer side), a bronze or golden appearance.

However, CVD methods present various problems, among which mention may in particular be made of the following:
- The deposition of the active layer is carried out on the actual line for manufacture of the glass substrate, with the difficulty presented by the flexibility of such a process and the major loss of glass during each start-up and/or adjustment of the CVD deposition.
- A lack of uniformity in the coating, both in composition and in thickness.
- Increased risks, as a result of the flammability of the gases used and their toxicity.

Furthermore, for example in the specific case of the use of these articles as oven door, there are additional problems of scratches, fingerprints, chemical resistance and a possible decoloration of the coating.

For all these reasons, other coatings are currently sought which exhibit the same properties of reflection but which can be deposited by techniques not exhibiting the abovementioned disadvantages.

Such deposition techniques are in particular the techniques of deposition by vacuum sputtering, which is often magnetron-assisted. These techniques are used in particular when the coating consists of a complex stack of successive layers, the thicknesses of which do not exceed a few nanometers or a few tens of nanometers.

For example, mention may be made of the application EP 1 238 950 A2, which describes a stack of thin layers which makes possible the reflection of infrared radiation by virtue of the use of a stack, the functional layer of which is a silver layer, surrounded by layers of $SiN_x$ in order to limit the haze. The present invention preferably relates to glass articles, the stacks of which do not comprise layers of silver or other precious metals, such as gold, or else of copper or any other conductive metal used to reflect infrared radiation.

The aim of the present invention is thus to provide a glass article, in particular a glazing, which exhibits a very high reflection in the visible region (380-780 nm), which exhibits a suitable coloration in transmission, especially a bronze or golden coloration, and which is sufficiently resistant thermally, mechanically and chemically in the application envisaged, especially in use as oven door.

More particularly, the present invention relates to a glass article comprising at least one glass substrate on which a stack of layers is deposited, said stack comprising at least one layer consisting of a layer of silicon nitride of formulation $SiN_x$, in which x is less than 1.25, the physical thickness of said $SiN_x$ layer being between 5 and 50 nm, and in which the light reflection in the visible region of the glass article, measured on the side where the stack or the layer is deposited, is greater than 20%.

In particular, according to the present invention, the adjustment of the thickness of the layer of silicon nitride of formulation $SiN_x$ to the value of the value x, within the ranges of values described above, makes it possible to obtain a value of the light reflection in the visible region of greater than 20%.

In addition, it can make possible a suitable color in transmission giving the glazing a bronze or golden coloration.

Generally, all the light and energy characteristics presented in the present description are obtained according to the principles and methods described in the international standard ISO 9050 (2003) relating to the determination of the light, solar and energy characteristics of the glazings used in glass for the construction industry.

According to specific and advantageous embodiments of the present invention, which can, if appropriate, be combined with one another:
- The silicon nitride layer exhibits a formulation $SiN_x$, in which x is less than 1.20, more preferably is less than 1.15, more preferably is less than 1.10, or even is less than 1.00. Very preferably, x is less than 0.90, indeed even less than 0.80 or else is less than 0.70. In the most preferred case, x is less than 0.6, indeed even is less than 0.5. The value x according to the invention corresponds to the mean value of x measured through the entire thickness of said $SiN_x$ layer.
- The $SiN_x$ layer exhibits a thickness of between 6 and 40 nm, in particular between 7 and 25 nm, especially between 10 and 20 nm.
- The light reflection in the visible region of the glass article, on the stack side, is greater than 30%, preferably greater than 35%, more preferably greater than 40% or even greater than 45%.
- The stack is essentially composed of said $SiN_x$ layer and of layers of dielectric materials. The term dielectric material is understood to mean any material, the resistivity of which is initially greater than $10^{10}$ ohm-meters ($\Omega \cdot m$). However, such materials can be doped in order to improve the electrical conductivity thereof in order to increase their cathode sputtering yield. For example, $Si_3N_4$ layers used in the stack according to the invention can comprise aluminum.
- The stack is composed of said $SiN_x$ layer and of at least one overlayer made of a dielectric material, more preferably chosen from oxides, nitrides and oxynitrides.
- The stack comprises the sequence of the following layers, starting from the surface of the glass substrate:
  - optionally, one or more underlayers made of dielectric material with a physical thickness, in total, of between 5 and 50 nm,
  - said layer of silicon nitride of formulation $SiN_x$,
  - one or more overlayers made of dielectric material, said layer(s) having a physical thickness, in total, of between 5 and 50 nm.

According to a preferred specific form, all the layers described above form a sequence without intermediate layers between them. According to a specific form, the stack consists of the sequence of layers described above.

The layer(s) of dielectric material are chosen from silicon nitride optionally doped with Al, Zr, B, an aluminum nitride, tin oxide, a mixed zinc tin oxide, a silicon oxide, a titanium oxide, silicon oxynitrides $SiO_xN_y$.

The stack comprises the sequence of the following layers, starting from the surface of the glass substrate:
  optionally an underlayer made of a dielectric material,
  said layer of silicon nitride of formulation $SiN_x$,
  an upper overlayer with a thickness of between 5 and 30 nm of silicon nitride optionally comprising Al, Zr, B. Optionally, the stack additionally comprises a titanium oxide overlayer. According to a preferred specific form, all the layers described above form a sequence without intermediate layers between them. According to a specific form, the stack consists of the sequence of layers described above.

The stack does not as a rule comprise metal layers having properties of reflection in the infrared region.

In particular, the stack according to the invention does not comprise layers based on silver, on gold or on copper, in particular does not comprise layers based on silver.

According to a specific embodiment of the present invention, the Si/N concentration is not constant in the thickness of the $SiN_x$ layer but varies from one end to another of the layer, from a lower nitrogen concentration toward a greater nitrogen concentration.

The glass article according to the invention can be mounted or employed according to any known form, for example in a single glazing, in a multiple glazing, for example double glazing, or else in a laminated glazing. The term laminated glazing is conventionally understood to mean a glazing comprising at least two glass substrates united by a plastic sheet, for example of the PVB or PU type.

The stack of layers comprising the layer of silicon nitride $SiN_x$ with x less than 1.25 according to the invention can be deposited in the glass article on any face of the latter.

According to a first example, when the stack is deposited on a single glazing which is an element of an oven door, this can advantageously be positioned on face 1 of the glazing, that is to say on the face of the glazing directed toward the inside of the cavity of the oven.

According to another example, when the stack is deposited on a constituent double glazing of an oven door, this can advantageously be positioned on face 2 or 3 of the glazing, preferably on face 2 of the glazing, the faces of the glazing being numbered from the inside (the cavity) of the oven toward the outside of said oven. In such a configuration, the stack is thus positioned between the two glass substrates of the double glazing and is thus protected.

The glass substrate can be used directly without additional treatment or alternatively can be used after having been subjected to a heat treatment which can be a tempering, a bending or a bending/tempering or annealing. Such a tempering consists, for example, of a heat treatment for 5 to 10 minutes at a temperature of between 600 and 750° C.

According to a first application, the glass article is used as (conventional or microwave) oven door or else as article for protection of an oven. The article can also be used for other household electrical applications, as gas cooker cover, wine cellar door, refrigerator door, frying pan protection, and the like.

The glass article can also be used as building glazing or else as motor vehicle glazing.

The glass article according to the invention comprises a stack capable of undergoing a heat treatment, such as a tempering, a bending or more generally a heat treatment at greater temperatures, without loss of its optical properties.

A glazing according to the invention also makes it possible to reflect a substantial portion of the light radiation passing through it, that is to say the wavelength of which is between approximately 380 and 780 nm, thus creating a mirror effect desired in some applications, such as oven doors or some glazings for buildings, in particular in countries having a great amount of sunlight.

In addition, the glass products according to the invention are resistant to moisture, to scratching and to acid attacks.

In particular, the glazings according to the invention exhibit an improved longevity, in the sense that their initial properties, in particular their variation in color and their optical properties, vary only very slightly under the chemical attacks to which they are subjected during their planned use.

They can thus advantageously be used as single glazing (just one glass substrate).

A process for the manufacture of a glass article according to the invention comprises, for example, the following stages:
  manufacture of a glass substrate,
  deposition, on the glass substrate, of a stack of layers by a vacuum cathode sputtering technique, preferably a magnetron-assisted one, including a layer of silicon nitride $SiN_x$ according to the invention, said layer being obtained by sputtering of a target comprising or essentially composed of silicon in an atmosphere comprising nitrogen and an ideal gas.

According to the invention, the content of nitrogen present in the $SiN_x$ layer is controlled by limiting the percentage of the nitrogen gas introduced into the sputtering chamber in the $N_2$/ideal gas mixture acting as plasma-generating gas. It is in particular understood, within the meaning of the present invention, that the layers of $SiN_x$ according to the invention can comprise a minimal portion of another element, in particular aluminum, of use during the vacuum deposition process in the sputtering of the silicon layer forming the cathode target in the plant. By way of example, use is conventionally made, at the current time, of silicon targets comprising 8% by weight of aluminum, in order to improve the conductivity thereof.

The examples which follow are given purely by way of illustration and do not limit, under any of the aspects described, the scope of the present invention. For purposes of comparison, all the stacks of the examples which follow are synthesized on the same Planiclear® glass substrate. All the layers of the stacks were deposited according to the well-known conventional techniques of vacuum depositions by magnetron sputtering.

EXAMPLES

In these examples, different thicknesses of an $SiN_x$ layer of variable composition are deposited, according to conventional magnetron techniques, on a substrate made of glass of the Planiclear® type sold by the applicant company.

The layers of nitrides are obtained according to the techniques of the art in the magnetron frame.

More specifically, the different layers made of $SiN_x$ were obtained in the same magnetron device by sputtering starting from targets made of silicon comprising 8% by weight of aluminum in two successive compartments of the device for deposition of the $SiN_x$ coating.

The sputtering of the silicon target is carried out in different atmospheres differing in the relative proportion of nitrogen and of neutral gas (argon) in the mixture making possible the formation of the silicon nitride layers.

The thickness of the $SiN_x$ layer is also varied according to the recognized techniques, in particular by varying the rate of forward progression of the glass substrate in the compartment and/or by modifying the power applied to the cathode.

Different samples were prepared by varying the composition and the thickness of the silicon nitride $SiN_x$ layer as indicated above. All of the data collected are collated in table 1.

Examples 3 to 5 were subjected to an additional tempering treatment after heating at 680° C. for 6 minutes.

TABLE 1

| Example | Speed of the line [m/min] | Power applied to the cathode [kW] | % $N_2$ in the $N_2$/Ar mixture |
|---|---|---|---|
| 1 | 3 | 50 | 5 |
| 2 | 4 | 50 | 5 |
| 3* | 2.8 | 35 | 3 |
| 4* | 3.5 | 40 | 5 |
| 5* | 3.5 | 40 | 5 |
| 6* | 3.5 | 40 | 35 |
| 7** | 3 | 55 | 45 |
| 8** | 4 | 55 | 45 |
| 9** | 3 | 60 | 50 |
| 10** | 4 | 60 | 55 |

*after tempering
**outside the invention

The light and energy characteristics presented in the present description are obtained according to the principles and methods described in the international standard ISO 9050 (2003) and the standard EN 410 (2011).

The colorimetric characteristics are measured on a spectrometer and are given below, according to the international colorimetric system L*, a*, b*.

The measurements are carried out on a Minolta Iso 1175 spectrometer.

More specifically:

$T_L$ is the light transmission, $b^*_T$ is the parameter b* measured in transmission, $b^*_{(R1)}$ is the parameter b* measured in reflection on the layers side (that is to say, of the face of the glazing on which the stack is deposited), R1 is the reflection of visible light on the layers side (illuminant D65, virtually normal incidence).

The thickness of the $SiN_x$ layers was determined by analyses of the edge face of the glazing by electron microscopy by analyses of the glazing by secondary ionization mass spectrometry techniques (Time of Flight Secondary Ion Mass Spectroscopy (ToF-SIMS)).

TABLE 2

| Example | $T_L$ (%) | $b^*_T$ | R1 (%) | $b^*_{(RL)}$ | Thickness of the $SiN_x$ layer (nm) | N/Si molar ratio in the layer |
|---|---|---|---|---|---|---|
| 1 | 25.6 | 15.5 | 48.6 | −2.2 | 20 | 0.4 |
| 2 | 33.5 | 16.0 | 40.1 | −4.5 | 13 | 0.4 |
| 3* | 28.3 | 16.0 | 45.2 | −3.5 | 15 | 0.5 |
| 4* | 27.2 | 16.3 | 47.0 | −3.3 | 15 | 0.5 |
| 5* | 22.6 | 16.3 | 52.5 | −2.0 | 20 | 0.5 |
| 6* | 61 | 2.5 | 33.1 | −13 | 20 | 1.13 |
| 7** | 69.3 | 11.0 | 22.1 | −8.8 | 10 | 1.33 |
| 8** | 76.5 | 8.5 | 16.5 | −8.6 | 15 | 1.33 |

TABLE 2-continued

| Example | $T_L$ (%) | $b^*_T$ | R1 (%) | $b^*_{(RL)}$ | Thickness of the $SiN_x$ layer (nm) | N/Si molar ratio in the layer |
|---|---|---|---|---|---|---|
| 9** | 87.4 | 1.3 | 10.7 | −4.4 | 15 | 1.33 |
| 10** | 85.5 | 2.0 | 12.6 | −6.0 | 20 | 1.33 |

*after tempering
**outside the invention

The composition of the layers was determined by conventional XPS analysis techniques coupled with means for abrasion of the layers.

More specifically, the appliance used is a Nova XPS device from Kratos, the analysis being carried out under the following conditions:

Source: Monochromatized Al Kα

300 watts for the specific spectra

Area analyzed: 110×110 μm² (μspot mode)

Detection angle: normal (α=0°)

Depth analyzed less then 10 nm in normal detection

The abrasion conditions are as follows:

Ions: Ar—2.0 keV

Scanning: 3×3 mm² centered on the analysis region

Rate of abrasion estimated with regard to $Ta_2O_5$: 3.4 nm/min

Abrasion cycles/cycle time: 30 cycles of 1 minute

The mean N/Si atomic ratio of the $SiN_x$ layer deposited immediately above the glass is close to 0.4-0.5 for the $SiN_x$ layer of examples 1 to 5.

The N/Si atomic ratio of the nitrogen nitride layer of examples 7 to 10 (outside the invention) is of the order of 1.33 and is in good agreement with a layer of the conventional general formulation $Si_3N_4$.

There is also observed, in the first $SiN_x$ layer, a nonlinear concentration of the nitrogen and of the silicon within the $SiN_x$ layer, with in particular a growth in the concentration of nitrogen from the surface of the substrate and, on the other hand, a decrease in the concentration of silicon from the surface of the substrate.

In order to confirm the chemical resistances of the functional layers deposited according to the preceding examples, the resistance to acids of the glazings described above was measured by the $SO_2$ test according to the conditions described in the standard EN 1096-2 (January 2001), Annex C.

In the L*, a*, b* colorimetric system and under normal incidence, the variation in color of the glazing in transmission, on conclusion of the acid treatment (25 cycles), was quantified using the quantity ΔE conventionally used in the L*, a*, b* international system and defined by the relationship:

$$\Delta E = \sqrt{(\Delta a^*)^2 + (\Delta b^*)^2 + (\Delta L^*)^2}$$

The measurements are carried out on a Minolta iso 1175 spectrometer.

The NSS and HH tests described in this same standard were also carried out.

For all these tests, variations in the $T_L$ ($\Delta T_L$) and in the quantity ΔE of less than 1% were measured.

The mechanical resistance properties of the glazings provided with the stacks were also measured on the sample of the preceding example 1.

The test carried out is an EST test.

The Erichsen Scratch Test EST, or scratch tester of 413 hardness, measures the scratch resistance of a thin layer. It is described in the standard EN 438-2 (ISO 4586-2). The sample rotates with a rotational speed of 5 rev/min. The weight can be adjusted in order for the force applied to the layer to be between 0.1 and 10 N with a Van Laar tip with a diameter of 0.5 mm.

The results of the test show a very slight scratching of the glazing, difficult to perceive with the eye, at a pressure of 10 newtons for the sample according to example 1.

Comparative Example

For the purposes of comparison, measurements were carried out, under the same conditions as above, on the optical and energy parameters of a Reflectasol™ glazing sold by Saint-Gobain Glass France, the active layer of which is a layer of silicon oxycarbide deposited by pyrolysis, and a glazing according to the invention comprising a substrate made of glass of the Planiclear® type sold by the applicant company, different stacks formed by the sequence of following layers:

| Glass | /SiN$_x$* | /Si$_3$N$_4$ | /TiO$_x$ |
|---|---|---|---|
|  | (15 nm) | (15 nm) | (5 nm) |

*x = 0.4

The different characteristics which make possible the direct comparison between the glazing according to the invention and the comparative glazing have been given in table 3 which follows.

TABLE 3

|  | Reflectasol | Invention |
|---|---|---|
| T$_L$ % | 31.0 | 31.0 |
| a* (T) | 3.5 | 4.2 |
| b* (T) | 17.0 | 16.5 |
| Rl (%) | 54.5 | 52.5 |
| a*$_{(Rl)}$ | −2.5 | −2.5 |
| b*$_{(Rl)}$ | 2.0 | 3.0 |

Optical and light transmission/reflection properties are found which are very similar to those of the Reflectasol product.

The results given above show that a glass article which reflects light sufficiently to obtain a mirror effect and bronze or golden color in transmission and which is mechanically and chemically resistant can be obtained by virtue of the deposition, at the surface of the article, of a stack comprising at least one layer of silicon nitride SiN$_x$ according to the invention, in which x is less than 1.25, preferably less than 1.20 or even x is less than 1.00.

The invention claimed is:

1. A glass article, comprising:
a glass substrate on which a stack of layers is deposited, wherein the stack comprises a layer comprising silicon nitride of a formulation SiN$_x$, in which x is less than 1.25, as an SiN$_x$ layer,
wherein a physical thickness of the SiN$_x$ layer is in a range of from 5 to 50 nm,
wherein the glass article has a light reflection, measured on a side of the substrate on which the stack is deposited, greater than 35%, and
wherein the stack does not comprise a layer based on silver.

2. The article of claim 1, wherein x is less than 1.00.

3. The article of claim 2, wherein the light reflection of the glass article, measured on the stack side, is greater than 40%.

4. The article of claim 1, wherein the stack comprises the SiN$_x$ layer and a layer comprising a dielectric material.

5. The article of claim 4, wherein the layer(s) of dielectric material comprise silicon nitride, aluminum nitride, tin oxide, a mixed zinc tin oxide, a silicon oxide, a titanium oxide, and/or silicon oxynitride SiO$_x$N$_y$.

6. The article of claim 4, wherein the layer(s) of dielectric material comprise silicon nitride doped with Al, Zr, and/or B, an aluminum nitride, tin oxide, a mixed zinc tin oxide, a silicon oxide, a titanium oxide, and/or silicon oxynitride SiO$_x$N$_y$.

7. The article of claim 1, wherein the stack comprises the SiN$_x$ is layer and an overlayer comprising a dielectric material.

8. The article of claim 7, wherein the dielectric material comprises an oxide, nitride, and/or oxynitride.

9. The article of claim 1, wherein the stack comprises a sequence of layers as follows, starting from a deposition surface of the glass substrate:
the SiN$_x$ layer; and
an overlayer comprising a dielectric material,
wherein, in total, all layer(s) have a physical thickness in a range of from 5 to 50 nm.

10. The article of claim 1, wherein the stack comprises a sequence of layers as follows, starting from a deposition surface of the glass substrate:
the SiN$_x$ layer; and
an upper overlayer with a thickness in a range of from 5 to 30 nm of silicon nitride.

11. The article of claim 10, further comprising:
a titanium oxide overlayer.

12. The article of claim 1, wherein the stack does not comprise metal layers having reflection properties in the infrared region.

13. The article of claim 1, wherein the stack does not comprise layers based on gold, and
wherein the stack does not comprise a layer based on copper.

14. The article of claim 1, wherein the Si/N concentration varies in the thickness of the SiN$_x$ layer.

15. The article of claim 1, wherein the stack comprises a sequence of layers as follows, starting from a deposition surface of the glass substrate:
an underlayer, comprising a dielectric material, with a total physical thickness in a range of from 5 to 50 nm;
the SiN$_x$ layer; and
an overlayer, comprising a dielectric material,
wherein, in total, all layer(s) have a physical thickness in a range of from 5 to 50 nm.

16. The article of claim 1, wherein the stack comprises a sequence of layers as follows, starting from a deposition surface of the glass substrate:
an underlayer comprising a dielectric material;
the silicon nitride layer of formulation SiN$_x$;
an upper overlayer with a thickness in a range of from 5 to 30 nm of silicon nitride doped with Al, Zr, and/or B.

17. The article of claim 1, wherein the stack consists of the silicon nitride layer and one or more layers of dielectric materials, and/or
wherein x in the SiN$_x$ layer is less than 0.8.

18. The article of claim 1, configured as a building glazing.

19. The article of claim 1, configured as a motor vehicle glazing.

20. An oven door or article suitable for protection of an oven, the door or article comprising:
the glass article of claim 1.

* * * * *